(12) United States Patent
Rochelo et al.

(10) Patent No.: US 6,230,885 B1
(45) Date of Patent: May 15, 2001

(54) MEMORY CARD PROTECTIVE CARRIER (75) Inventors: Donald R. Rochelo; Robert W. Jones, both of Pittsfield, MA (US)

(73) Assignee: Donald Rochelo, Pittsfield, MA (US)

( * ) Notice: Subject to any disclaimer, the term of this patent is extended or adjusted under 35 U.S.C. 154(b) by 0 days.

(21) Appl. No.: 09/547,268

(22) Filed: Apr. 11, 2000

(51) Int. Cl.⁷ .................................................. B65D 85/30
(52) U.S. Cl. ......................... 206/308.3; 206/454; 206/1.5
(58) Field of Search ................................. 206/308.3, 449, 206/1.5, 555, 451, 454, 459.5, 456, 309.2

(56) References Cited

U.S. PATENT DOCUMENTS

| | | |
|---|---|---|
| 4,651,872 | 3/1987 | Joyce . |
| 4,664,258 | 5/1987 | Eichner . |
| 4,676,374 | 6/1987 | Wilkins . |
| 4,691,826 | 9/1987 | Ozeki . |
| 4,700,840 | 10/1987 | Haddock . |
| 4,724,956 | 2/1988 | Ozeki . |
| 4,776,463 | 10/1988 | Press . |
| 4,957,205 | 9/1990 | Rose, Jr. . |
| 5,224,599 | 7/1993 | Uchida . |
| 5,318,222 | 6/1994 | Bartlett . |
| 5,385,235 | 1/1995 | Ikebe et al. . |
| 5,407,073 | 4/1995 | Uchida . |
| 5,445,264 | 8/1995 | Uchida . |
| 5,529,183 | 6/1996 | Nishikawa . |
| 5,699,905 | 12/1997 | Hara . |
| 5,772,020 | 6/1998 | Hara . |
| 5,988,374 | * 11/1999 | Funawatari et al. .............. 206/308.3 |
| 6,095,327 | * 8/2000 | Ikebe et al. ........................ 206/308.3 |

* cited by examiner

Primary Examiner—Paul T. Sewell
Assistant Examiner—Shizan Luong
(74) Attorney, Agent, or Firm—Malcolm Chisholm (57) ABSTRACT

The invention is a memory card protective carrier for carrying memory cards and for protecting data transfer ports of the cards. The carrier includes a back frame secured adjacent a front frame having at least one memory card sleeve between the back and front frames. The card sleeve includes a top strut opposed to a bottom strut, an inside strut positioned between the top and bottom struts, wherein the top, bottom and inside struts cooperate to define a card slot dimensioned to house a memory card so that top and bottom edges of the card are adjacent the top and bottom struts. The front frame includes a window perimeter that defines a card window and includes a positioning guide adjacent the top strut in the shape of an asymmetrical corner dimensioned to correspond to an asymmetrical corner of the memory card. The back frame defines a compression tap aperture opposed to the card window, and includes at least one compression tab projecting into the card slot. The memory card sleeve also includes a protective band defined within the back frame that extends from adjacent the top strut toward the bottom strut a distance that is adequate to overlie and protect data transfer ports of the memory card whenever the memory card is positioned within the card slot with the asymmetrical corner of the memory card adjacent the asymmetrical corner of the window perimeter.

19 Claims, 5 Drawing Sheets

MEMORY CARD PROTECTIVE CARRIER

BACKGROUND OF THE INVENTION

The present invention relates carriers for memory devices, and in particular relates to a device that both carries and protects memory cards.

Common to personal computers and consumer electronic components are portable memory devices, such as the well known three and one-half inch floppy diskette. That diskette includes a magnetic memory media housed within a rigid plastic case including a spring biased, metal slide gate on a top or insertion edge of the diskette case. Whenever such a diskette is inserted within a computer or consumer electronic component, such as an electronic keyboard, the slide gate slides from a closed to an open position to provide access by the computer or component to the magnetic media within the plastic case. It is well known that the three and one-half inch diskettes are commonly used for transferring data from one computer to another, for backing up a computer in order to preserve data in the event of failure of the computer, for transferring data from a computer to a consumer electronic component, and for various other common tasks. Consequently, there are many carriers available for storing the three and one-half inch diskettes.

Most carriers for such diskettes have common features. Typically they provide for ease of access to identifying labels on the diskettes, so a user may readily select a specific diskette without searching through many diskettes to find the specific diskette. For example, a recent diskette carrier is shown in U.S. Pat. No. 5,772,020 issued on Jun. 30, 1998 to Hara. The Hara carrier includes a planar sheet having six holding cavities for six diskettes wherein a user may readily view front or label surfaces of the diskettes. Opposed, biased "pressing strips" extend from an edge of each cavity to apply pressure to the diskette to secure it within the cavity. The pressing strips are positioned to avoid substantial direct contact with the metal slide gate because the gate is well known to be delicate, and any excessive pressure could easily damage the slide gate, or the magnetic media under the gate within the plastic case of the diskette. U.S. Pat. No. 5,529,183 issued on Jun. 25, 1996 to Nishikawa and U.S. Pat. No. 4,676,374 issued on Jun. 30, 1987 to Wilkins are also typical of three and one-half inch diskette carriers in having resilient tabs to secure the diskette within carrier cavities, wherein the tabs are positioned adjacent opposed side edges of the data transfer port or slide gate. Consequently, the peripheral regions of cavities or diskette sleeves of the known information carriers for diskettes invariably have an exposed region, wherein the slide gate or information transfer port is not protected by the carrier against contamination or impact damage.

Recently, a new form of information or memory storage and transfer device has been introduced into the consumer electronic field in particular. This new memory transfer device is generally referred to as a "flash memory card", a "memory card", an "SD memory card" or a "MultiMedia card". These cards are characterized as non-volatile, solid state memory devices for digital storage. For convenience, the cards will hereinafter be referred to as "memory cards". Known memory cards have a capacity of up to 64 megabytes, and it is anticipated that 256 megabyte memory cards will be available in the near future.

The memory cards are generally rectangular, being about 32 millimeters ("mm") long, by about 24 mm wide. Each memory card includes a front or label surface, and a back or data transfer surface. Each memory card also includes a top or insertion end which is the end of the card to be inserted into a card receiving electronic device, such as the now available "MP3 Player" for audio reproduction sold by PONTIS, Inc. of Schwarzenfeld, Germany.

Adjacent the insertion end of the memory card on the back side of the card are a plurality of data transfer ports that may be isolated metal contacts. To make sure that a user does not insert the memory card into the electronic device upside down, or backwards, one corner of the insertion end of the memory card is a non-right angle, or asymmetrical corner. If a memory card was aligned so that the data transfer or back surface was hidden from a user, and the insertion edge was the top edge, then a top right corner would be the asymmetrical corner. The top left corner is symmetrical to the bottom left corner, and the two bottom corners are symmetrical to each other. By industry standards, however, the top right corner of known memory cards is asymmetrical, which may mean that the corner is formed of two angles totaling ninety degrees. For purposes herein however, the phrase "asymmetrical corner" is meant to include any corner in a memory storage and/or transfer device that is distinct from the remaining corners of the memory device for the purposes of correct alignment of the memory device within an electronic apparatus that receives the memory device.

Known carriers for rigid case memory storage devices, however, are limited to carriers for three and one-half inch types of diskettes, and those carriers do not provide adequate protection for exposed data transfer ports. If the data transfer ports on new memory cards are contaminated by liquids, salt deposits or abrasive particles, retrieval of information stored on the cards may be jeopardized, and the memory cards may actually damage the electronic devices into which the cards are inserted. Additionally, static discharge onto the data transfer ports of memory cards may destroy data stored within the cards. Accordingly there is a need for a memory card carrier device that both facilitates ease of access to and carrying of the cards and that also protects data transfer ports of the cards while the cards are stored within the carrier.

SUMMARY OF THE INVENTION

The invention is a memory card protective carrier for carrying memory cards and for protecting data transfer ports of the cards. The carrier includes a back frame secured adjacent a front frame having at least one memory card sleeve between the back and front frames. The card sleeve includes a top strut opposed to a bottom strut, an inside strut positioned between the top and bottom struts, wherein the top, bottom and inside struts extend between the front and back frames to define a card slot dimensioned to house a memory card so that top and bottom edges of the card are adjacent the top and bottom struts. The sleeve also includes a lock shoulder projecting from the front frame toward the back frame from a position opposed to the inside strut that secures the memory card within the card slot between the lock shoulder, inside strut, and the top and bottom struts. The front frame defines a card window that is smaller than a label surface of the memory card, and the card window is defined by a window perimeter dimensioned to overlie a perimeter of the memory card to secure the card from extraction from the card slot through the card window. The window perimeter includes a positioning guide adjacent the top strut, and the positioning guide is in the shape of an asymmetrical corner dimensioned to correspond to an asymmetrical corner of the memory card. The back frame defines a compression tap aperture opposed to the card window, and includes at least one compression tab projecting from the back frame within the aperture and into the card slot. The compression tab is biased to apply pressure to the memory card within the card slot to secure the memory card between the top, bottom and side struts and the lock shoulder. The memory card sleeve also includes a protective band defined within the back frame that extends from adjacent the top strut toward the bottom strut a distance that is adequate to overlie and protect data transfer ports of the memory card whenever the memory card is positioned within the card slot with the asymmetrical corner of the memory card adjacent the asymmetrical corner of the window perimeter.

In a preferred embodiment, the protective band extends from adjacent the top strut toward the bottom strut a distance that is at least fourteen per cent of a shortest distance between the top and bottom struts. In an additional embodiment, the protective band also extends from adjacent the bottom strut toward the top strut a distance that is at least fourteen per cent of the shortest distance between the bottom and top struts; and extends from adjacent the inside strut toward the lock shoulder a distance that is at least twenty per cent of a shortest distance between the inside strut and the lock shoulder; and extends from adjacent the lock shoulder toward the inside strut a distance that is at least twenty per cent of a shortest distance between the inside strut and the lock shoulder so that the protective band forms one continuous band overlying and protecting a substantial portion of the data transfer surface of the memory card.

In an alternative embodiment the back and front frames define a plurality of card sleeves, and in a particular embodiment, four card sleeves are defined between the front an back frames, wherein components of the first and third memory card sleeves are disposed in mirror image association with components of the second and fourth memory card sleeves to enhance efficiency of space utilization and ease of use of the carrier. In yet another embodiment, the back frame and front frame are formed as one piece secured together by a hinge so that the entire carrier may be manufactured in a single mold and the back and front frames may be secured together by a plurality of couplers to simplify manufacture.

Accordingly, it is a general object of the present invention to provide a memory card protective carrier that overcomes the deficiencies of prior art carriers.

It is a more specific object to provide a memory card protective carrier that facilitates carrying, ease of access, and protection of memory cards within the carrier.

It is yet another object to provide a memory card protective carrier that protects data transfer ports of memory cards within the carrier.

It is a further object to provide a memory card protective carrier that is formed from a single piece to simplify manufacture.

These and other objects and advantages of the present memory card protective carrier invention will become more readily apparent when the following description is read in conjunction with the accompanying drawings.

DESCRIPTION OF THE PREFERRED EMBODIMENTS

Figure 1:
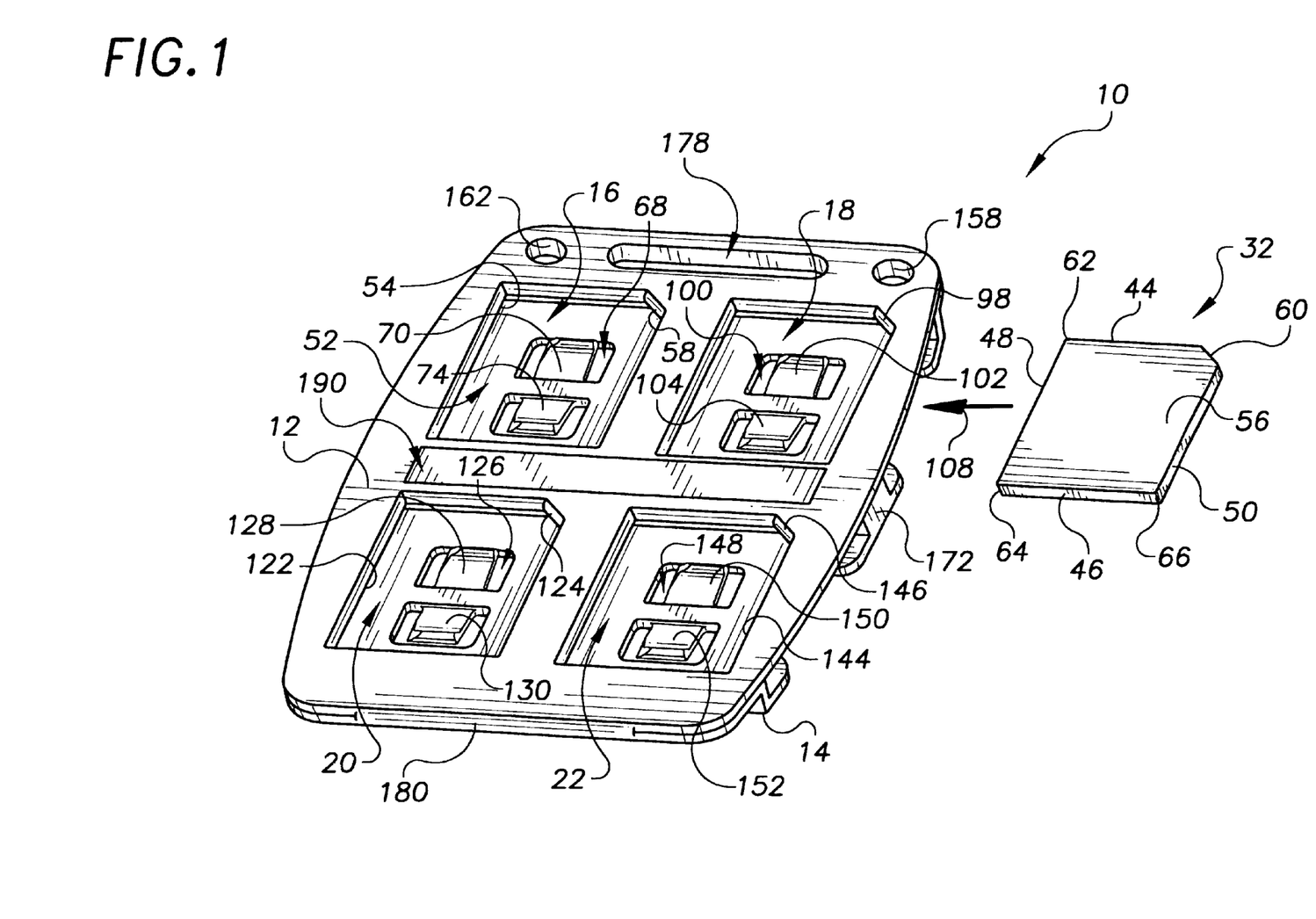
FIG. 1 is a front perspective view of a memory card protective carrier constructed in accordance with the present invention, showing a memory card positioned to be inserted within the carrier.
Figure 2:
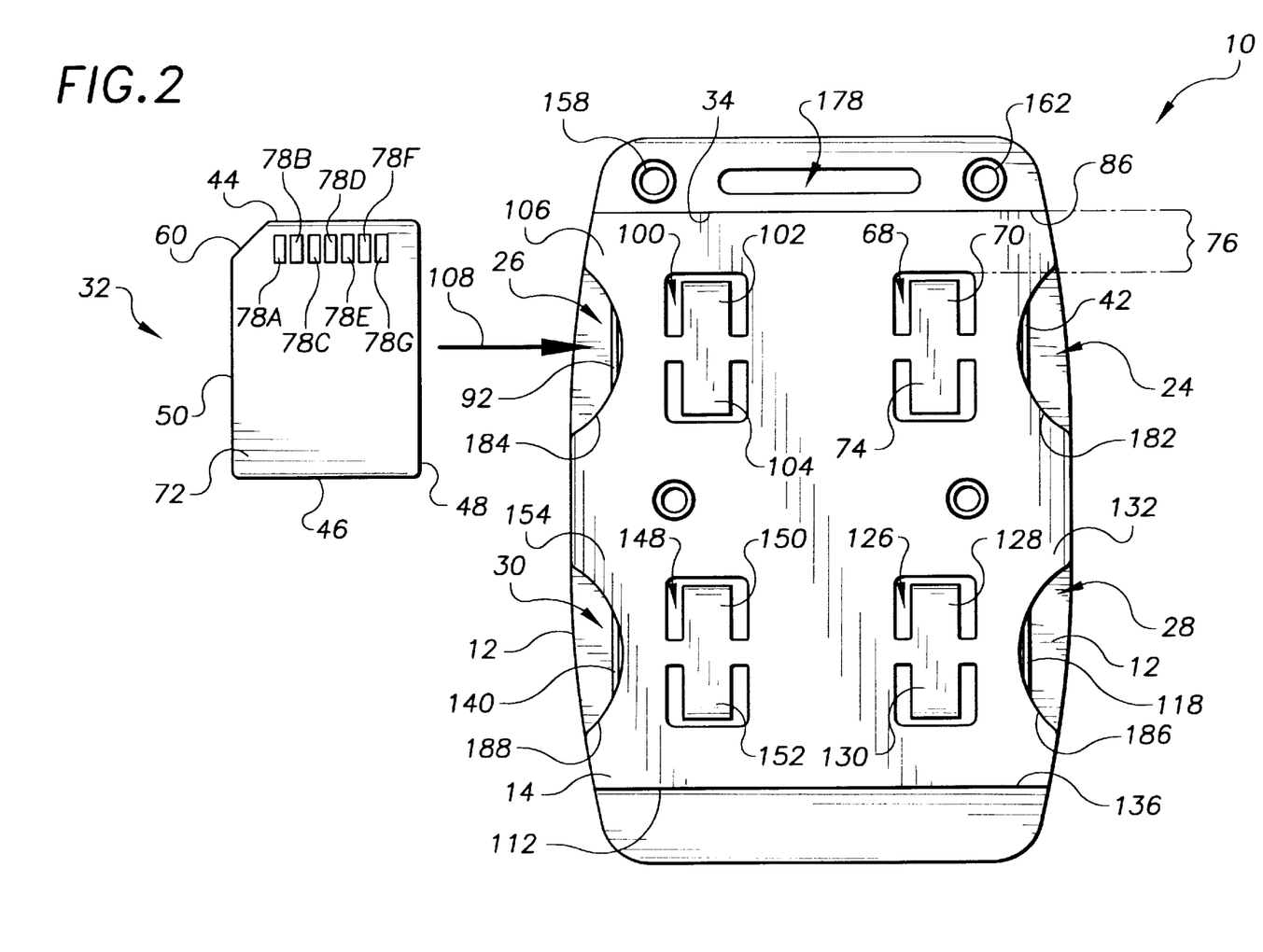
FIG. 2 is back plan view of the FIG. 1 memory card protective carrier showing data transfer ports on the memory card.

Referring to the drawings in detail, a memory card protective carrier of the present invention is shown in FIGS. 1–5, and is generally designated by the reference numeral 10. As seen in FIGS. 1 and 2, the memory card protective carrier 10 includes a front frame 12 and an opposed back frame 14 that cooperate to form a first memory card sleeve 16, a second memory card sleeve 18, a third memory card sleeve 20, and a fourth memory card sleeve 22. Each memory card sleeve 16, 18, 20, 22 includes similar components that surround and define a first, a second, a third and a fourth card slot 24, 26, 28, 30 that are dimensioned to receive and secure a memory card 32 (shown in FIGS. 1 and 2). It is pointed out that the card slots 24, 26, 28, 30 are voids within the carrier that are defined by components of the card sleeves 16, 18, 20, 22. While a preferred embodiment shown in FIGS. 1–6 includes four card sleeves 16, 18, 20, 22, the present invention includes embodiments with one or more card sleeves.

Figure 3:
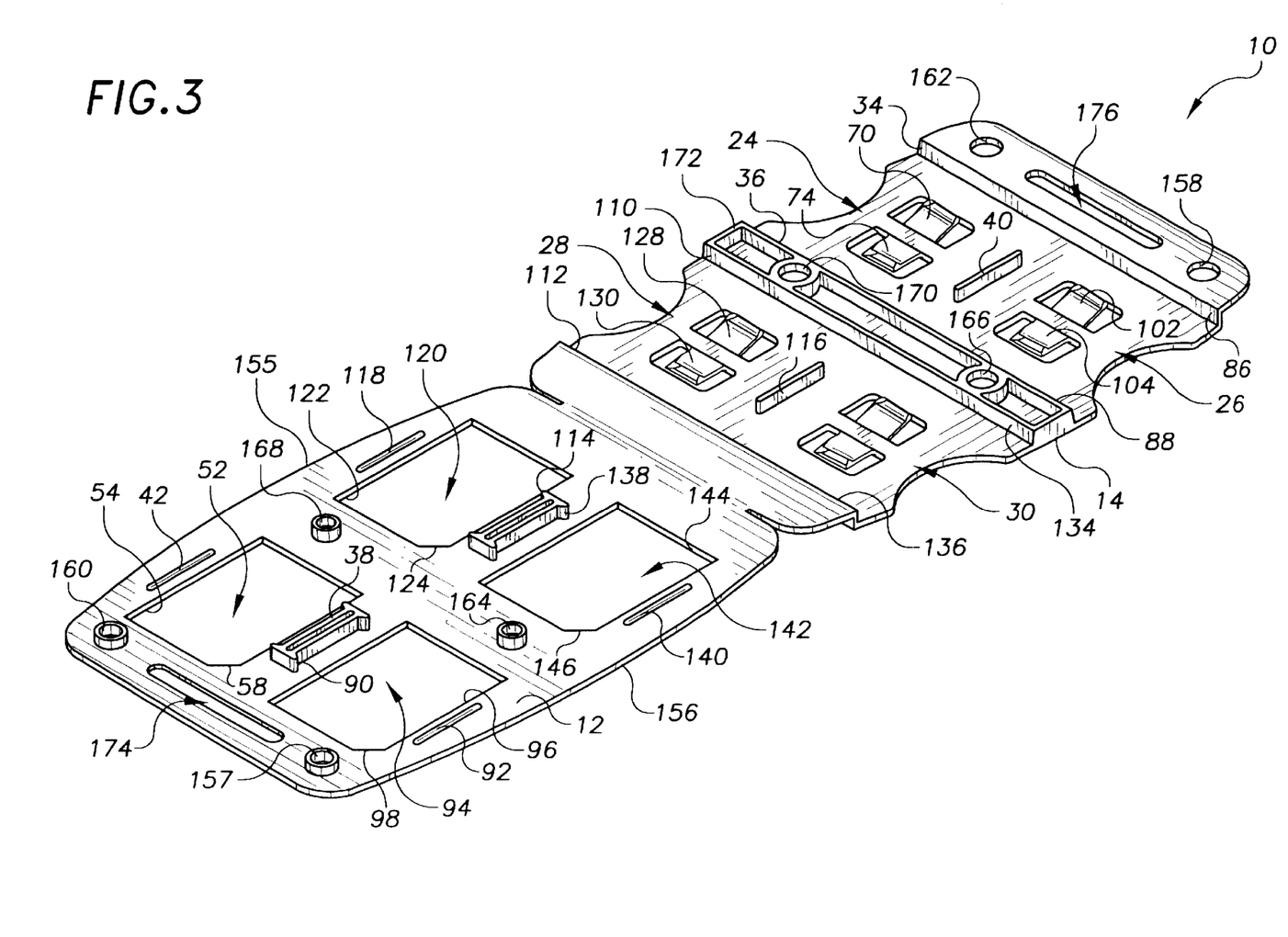
FIG. 3 is a perspective view of back and front frames of the memory card protective carrier as a single piece.

The components of the front and back frames 12, 14 that cooperate to form components defining the card sleeves 16, 18, 20 and 22 are best shown in FIG. 3. The first card sleeve 16 includes a first top strut 34, a first bottom strut 36 opposed to the first top strut 34, and a first inside strut 38 positioned between the first top and bottom struts 34, 36. As seen in FIG. 3, the first inside strut 38 may be dimensioned to receive a first inside strut coupler 40 when the front and back frames 12, 14 are formed as one piece, so that the first inside strut 38 receives the first inside strut coupler 40 to assist in securing the front and back frames 12, 14 together. The first card sleeve 16 also includes a first lock shoulder 42 extending from the front frame toward 12 the back frame 14 from a position opposed to first inside strut 38 and between the first top and bottom struts 34, 36. The first top and bottom struts 34, 36, the first inside strut 38 and the first lock shoulder 42 are positioned to cooperate in surrounding a memory card, such as the memory card 32, so that, if the memory card 32 was positioned within the first card sleeve 16, a top or insertion edge 44 of the card 32 would be adjacent the first top strut 34, and a bottom edge 46 would be positioned adjacent the first bottom strut 36 while the first inside strut 38 and first lock shoulder 42 further surround a left edge 48 an opposed right edge 50 of the of the memory card 32 to secure it within the first card sleeve 16.

Figure 4:
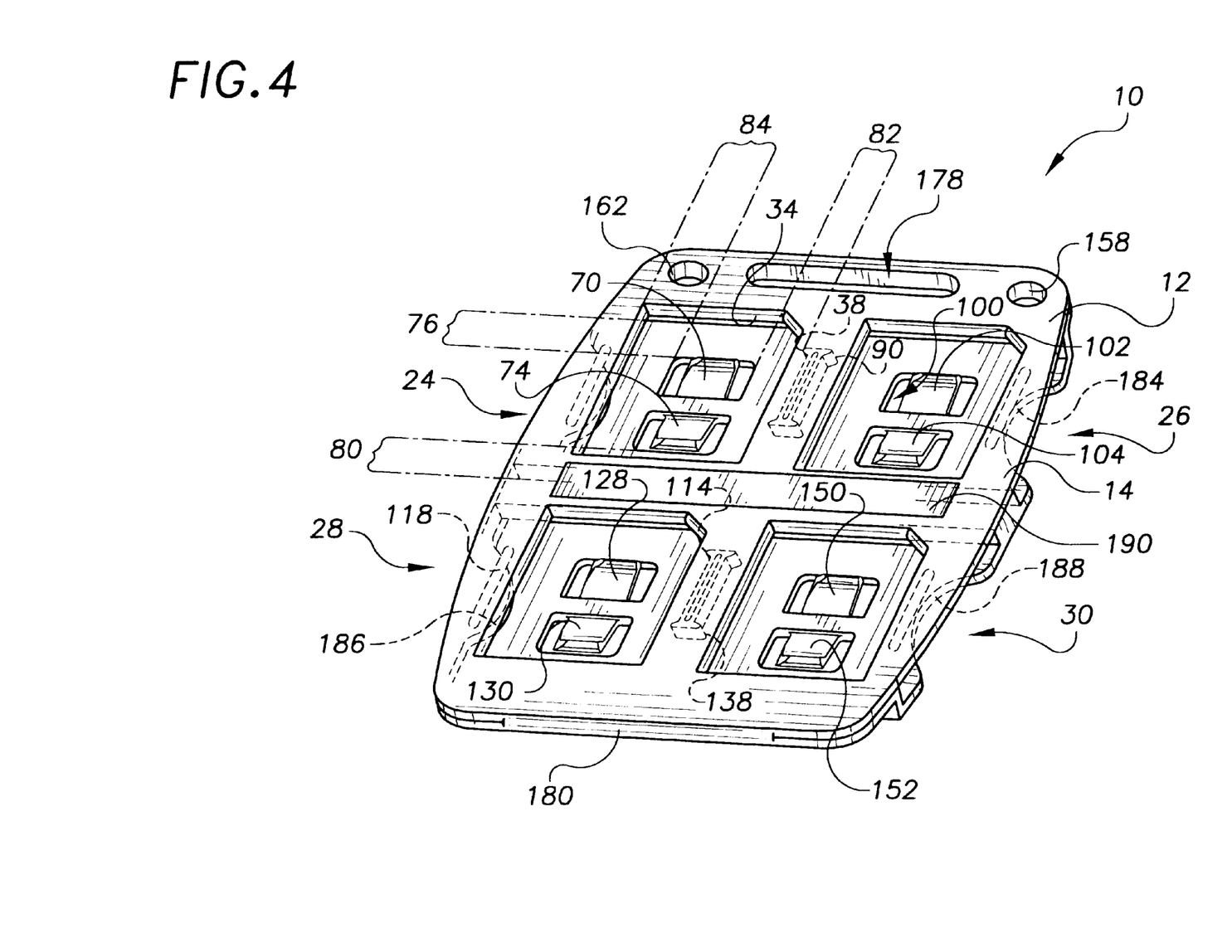
FIG. 4 is a front perspective view of the memory card protective carrier showing a back frame in hatched lines.

The first memory card sleeve 16 also includes a first card window 52 defined within the front frame 12 by a first window perimeter 54 to be smaller than a front or label surface 56 of the memory card 32 to thereby secure the card 32 from extraction through the card window 52, while affording ready visual access to any labels on the label surface 56 of the card 32 to facilitate distinguishing one memory card from another. The first window perimeter 54 includes a first positioning guide 58 positioned adjacent the first top strut 34 when the front frame 12 and back frame 14 are secured adjacent each other (as shown in FIGS. 1, 2 and 4), and the positioning guide is in the shape of an asymmetrical corner dimensioned to correspond to an asymmetrical corner 60 of the memory card 32. As recited above, for purposes herein the asymmetrical corner 60 of the memory card is defined to include any corner in a memory storage and/or transfer device that is distinct from the remaining corners of the memory device for the purposes of correct alignment of the memory device within an electronic apparatus that receives the memory device. Looking at the memory card 32 as shown in FIG. 1 so that the label 56 surface is facing a user, the asymmetrical corner 60 would be positioned between the top or insertion edge 44 and the right edge 50 of the card. The insertion or top left corner 62 of the memory card 32 in contrast is symmetrical to a bottom left corner 64, and the bottom left corner 64 is symmetrical to a bottom right corner 66, to assist in definition of the asymmetrical corner 60 of the memory card.

The first memory card sleeve 16 also includes a first compression tab aperture 68 (shown in FIG. 2) defined within the back frame 14 opposed to the first card window 52, and a first compression tab 70 extends from the back frame 14 into the first compression tab aperture 68 in a direction toward the first card window 52 in order to apply biasing pressure against a back or data transfer surface 72 of the memory card 32 whenever the card 32 is positioned within the first card slot 24. As shown best in FIGS. 1–3, the first compression tab 70 may be in the form of a first pair of compression tabs having a first 70 and second tab 74 extending into the first card slot 32 from the back frame 14 to apply greater pressure against the memory card 32.

The first memory card sleeve 16 also includes a first protective band 76 (shown in FIGS. 2 and 4) defined within the back frame 14 that extends from adjacent the first top strut 34 toward the first bottom strut 36 a distance that is adequate to over lie and protect a plurality of data transfer ports 78A, 78B, 78C, 78D,78E, 78F, 78G defined adjacent the insertion or top edge 44 and on the data transfer surface 72 (shown in FIG. 2) of the memory card 32 whenever the memory card 32 is positioned within the first card slot so that the asymmetrical corner 60 of the card 32 is adjacent the first positioning guide 58. In a preferred embodiment, the first protective band 76 extends a first extension distance 76 from adjacent the first top strut 34 toward the first bottom strut 36 a distance that is at least fourteen per cent of a shortest distance between the first top and bottom struts 34, 36. In an additional preferred embodiment (as shown best in FIG. 4), the first protective band 76 also extends a second extension distance 80 from adjacent the first bottom strut 36 in a direction toward the first top strut 34 a distance that is at least fourteen per cent of a shortest distance between the first bottom and top struts 36, 34, which distance is represented by the reference numeral 80 in FIG. 4. In a further embodiment, the first protective band 76 may also extend a third extension distance 82 from adjacent the first inside strut 38 toward the first lock shoulder 42 a distance that is at least twenty per cent of a shortest distance between the first inside strut 38 and first lock shoulder 42, and extends a fourth extension distance 84 from adjacent the first lock shoulder 42 toward the first inside strut 38 a distance that is at least twenty per cent of a shortest distance between the first inside strut 38 and lock shoulder 42. The first protective band 76 thereby forms one continuous band 76 overlying and protecting a substantial portion of the data transfer surface 72 of the memory card 32 if the card 32 was stored within the first memory card sleeve 16 whenever the asymmetrical corner 60 of the card 32 is positioned adjacent the first positioning guide 58.

The second memory card sleeve 18, third memory card sleeve 20 and fourth memory card sleeve 22 also include components virtually identical to the above-identified components of the first memory card sleeve 16. Therefore only the key elements will be described herein with respect to the attached drawings wherein positional relationships of those elements are virtually the same as similar named elements of the first memory card sleeve 16 described above, for the sake of efficiency. As best seen in FIG. 3, the second memory card sleeve 18 includes a second top strut 86, an opposed second bottom strut 88, a second inside strut 90 that cooperate to define the second card slot 26, a second lock shoulder 92, a second card window 94, a second card window perimeter 96, a second positioning guide 98, a second compression tab aperture 100 defined within the back frame 14 including a second compression tab pair 102 having the first tab 102 and a second tab 104 of the pair extending into the second card slot 26, and a second protective band 106 (shown in FIG. 2) that may be dimensioned in a manner similar to the first protective band 76 to overlie and protect data transfer ports 78A, 78B, 78C, 78D, 78E, 78F, 78G of the memory card 32 whenever the memory card 32 is positioned within the second card slot so that the asymmetrical corner 60 is adjacent the second positioning guide 98, which is suggested by the directional arrow 108 in FIGS. 1 and 2.

Similarly, the third memory card sleeve 20 includes a third top strut 110, an opposed third bottom strut 112, a third inside strut 114 that may also be dimensioned to receive a second inside strut coupler 116, wherein the third top, bottom and inside struts 110, 112, 114 cooperate to define the third card slot 28, a third lock shoulder 118, a third card window 120, a third card window perimeter 122, a third positioning guide 124, a third compression tab aperture 126 defined within the back frame 14 including a third compression tab pair 128 having the first pair tab 128 and a second tab 130 of the pair extending into the third card slot 28, and a third protective band 132 (shown in FIG. 2) that may be dimensioned in a manner similar to the first protective band 76 to overlie and protect data transfer ports 78A, 78B, 78C, 78D, 78E, 78F, 78G of the memory card 32 whenever the memory card 32 is positioned within the third card slot 28 so that the asymmetrical corner 60 is adjacent the third positioning guide 124.

The fourth memory card sleeve 22 is virtually the same as well, and includes a fourth top strut 134, an opposed fourth bottom strut 136, a fourth inside strut 138, wherein the fourth top, bottom and inside struts 134, 136, 138 cooperate to define the fourth card slot 30, a fourth lock shoulder 140, a fourth card window 142 defined by a fourth card window perimeter 144, a fourth positioning guide 146, a fourth compression tab aperture 148 defined within the back frame 14 including a fourth compression tab pair 150 having the first pair tab 150 and a second tab 152 of the pair 150 extending into the fourth card slot 30, and a fourth protective band 154 (shown in FIG. 2) that may be dimensioned in a manner similar to the first protective band 76 to overlie and protect data transfer ports 78A, 78B, 78C, 78D, 78E, 78F, 78G of the memory card 32 whenever the memory card 32 is positioned within the fourth card slot 30 so that the asymmetrical corner 60 of the memory card 32 is adjacent the fourth positioning guide 146.

As shown clearly in FIGS. 3 and 4, the first and third memory card sleeves 16, 20 include components that are disposed in mirror image association with similar components of the second and fourth memory card sleeves 18, 22. In particular, the first top strut 34, first bottom strut 36, first inside strut 38 and first lock shoulder 42 of the first memory card sleeve 16 are disposed in mirror image association with the second top strut 86, second bottom strut 88, second inside strut 90, and second lock shoulder 92 of the second memory card sleeve 18; while the third top strut 110, third bottom strut 112, third inside strut 114, and third lock shoulder 118 of the third memory card sleeve 20 are disposed in mirror image association with the fourth top strut 134, fourth bottom strut 136, fourth inside strut 138, and fourth lock shoulder 140 of the fourth memory card sleeve 22 when the front frame 12 and back frame 14 are secured adjacent each other, as shown in FIG. 4.

The described mirror image association of components of the first and second memory card sleeves 16, 18, and of components of the third and fourth memory card sleeves 20, 22, provides a remarkably efficient carrier 10 that enhances efficiency of manufacture and ease of use. For example and as is apparent, by the mirror image associations, bottom, top and inside struts may be defined within common edges and/or protrusions of the front and back frames 12, 14. Also, because of the aforesaid mirror image association, the four card slots 24, 26, 28, 30 defined by those components of the four memory card sleeves 16, 18, 20, 22 provide for entry of memory cards into the four slots at a first edge 155 of the front frame 12 and at an opposed second edge 156 of the front frame, thereby providing for efficient use of the carrier 10.

It is apparent as well from FIGS. 1 and 3, that the four positioning guides 58, 98, 124, 146, are not disposed in mirror image association, and instead are disposed in what will be referred to herein for convenience as a serial alignment. As best shown in FIG. 3 the first positioning guide 58 is positioned so that it is at a corner of the first card window perimeter 54 opposed to the first lock shoulder 42, while the second positioning guide 98 is positioned so that it is at a corner of the second card window perimeter 96 adjacent the second lock shoulder 92. The third positioning guide 124 and fourth positioning guide 146 are likewise at opposed corners of the third and fourth window perimeters 122, 144. By that serial alignment of the positioning guides 58, 98 and 124, 146, the memory card protective carrier 10 facilitates positioning of cards in each of the four card slots 24, 26, 26, 30 so that the four protective bands 76, 106, 132, 154 on the back frame 14 of the carrier 10 always cover and protect data transfer ports of memory cards placed within the four card slots 24, 26, 28, 30 when the cards are positioned so that asymmetrical corners of the cards, such as the asymmetrical corner 60 of memory card 32, are secured adjacent the positioning guides 58, 98, 124, 146. The serial alignment also provides for label or front surfaces of memory cards, such as the label surface 56 of memory card 32, being positioned within the four card windows 52, 94, 120, 142 for ease of viewing the labels on the cards whenever the cards are positioned so that asymmetrical corners of the cards, such as the asymmetrical corner 60 of memory card 32, are secured adjacent the positioning guides 58, 98, 124.

The memory card protective carrier 10 also includes a plurality of couplers to secure the front frame 12 to the back frame 14, such as a first post coupler 157 positioned adjacent the fourth positioning guide 148 and dimensioned to be secured within a first slot coupler 158 on the back frame; a second post coupler 160 opposed to the first post coupler 145 dimensioned to be secured within a second slot coupler 162 opposed to the first slot coupler; a third post coupler 164 positioned between the second card window 94 and the fourth card window 142 and dimensioned to be secured within a third slot coupler 166; and a fourth post coupler 168 secured between the first card window 52 and the third card window 120 and dimensioned to be secured within a fourth slot coupler 170 positioned on the back frame 14. Additional coupler means for securing the front frame 12 to the back frame 14 may also be used, such as coupler structures well known in the plastic manufacturing arts. The back frame 14 may also include a support bar 172 to assist supporting the front and back frames 12, 14 in a stable positional relationship, and as shown in FIG. 3, the support bar may house the third and fourth slot couplers 166, 170, and may even define the first and second bottom struts 36, 88, and the third and fourth top struts 110, 134. The front frame 12 may also define a front mounting slot half 174 that cooperates with a back mounting slot half 176 in the back frame 14 to form a mounting slot 178 for supporting the memory card protective carrier 10 in a file or similar mounting system with other carriers (not shown). The front frame 12 and back frame 14 may be formed of separate pieces and secured together by the above-described coupler means, or for ease of manufacture, the front frame 12 and back frame 14 may be formed of a single piece joined together by a hinge 180 (shown in FIG. 1) that permits the front frame 12 to pivot toward and be coupled to the back frame 14 and secured by the coupler means to form the memory card protective carrier 10.

Figure 5:
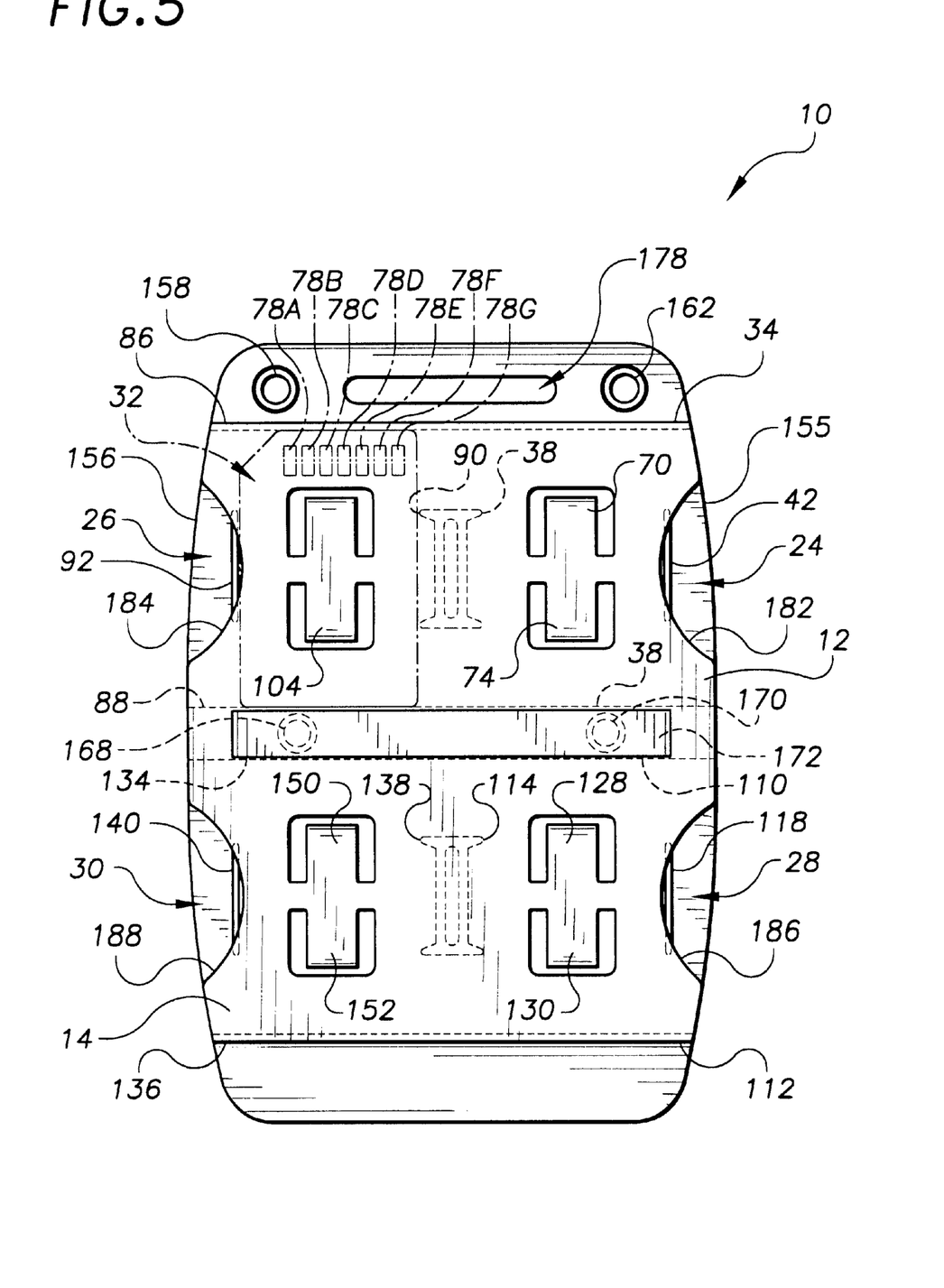
FIG. 5 is a back plan view of the FIG. 2 memory card protective carrier showing in hatched lines a memory card within the carrier.

As best seen in FIGS. 2 and 5, the first memory card sleeve 16 may also include a first finger recess 182 defined by a crescent shape within the back frame adjacent the first lock shoulder 42 to assist a user in sliding the memory card 32 in an out of the first card slot 24. Similarly, the second memory card sleeve 18 may also include a second finger recess 184 adjacent the second lock shoulder 92; the third memory card sleeve 20 may include a third finger recess 186 adjacent the third lock shoulder 118; and, the fourth memory card sleeve 22 may also include a fourth finger recess 188 adjacent the fourth lock shoulder 140. The memory card protective carrier may also include an indexing strip 190 on the front frame 12 between the first, second memory card sleeves 16, 18 and the third and fourth memory card sleeves 20, 22 so that a user may add an identifying index to the indexing strip 190 to identify the carrier 10 as distinct from other carriers without having to apply separate labels to the memory card 32 secured within the carrier 10.

In use of the memory card protective carrier 10, the memory card 32 may be secured within one of the card slots, such as the second card slot 26 as shown in FIG. 5. The second pair of compression tabs 102, 104 are biased into the second card slot 26 to apply adequate pressure to secure the memory card 32 against the second lock shoulder 92 extending from the front frame 12, while the card 32 is abutting the second top, bottom and side struts 86, 88, 90 extending between the front and back frames 12, 14. As best seen in FIG. 5, while the memory card 32 is secured within the second card slot with its asymmetrical corner 60 adjacent the second positioning guide 98 of the second memory card sleeve 18, the data transfer ports 78A, 78B, 78C, 78D, 78E, 78F, 78G of the card are completely covered by the second protective band 106 to thereby protect the data ports from contamination or contact with a foreign object or static electricity discharge. To extract the memory card from the second card slot 26, a user simply applies a gentle pressure to the card 32 through the second card window 94 to move the compression tabs 102, 104 toward the back frame 14 until the card is depressed toward the back frame 14 an adequate distance to slide over the second lock shoulder 92 and out of the second card slot 26. The memory card protective carrier 10 may be made of any of a variety of materials appropriate for manufacturing information storage and/or transfer devices, such as common plastics. A preferred material is polypropylene because it will absorb shock in the event the carrier 10 is dropped thereby minimizing any impact damage to memory cards stored within the carrier 10.

Additionally, polypropylene facilitates usage of the hinge 180 as an integral component of the carrier 10 for manufacture of the front and back frames 12, 14 as one piece.

While the present invention has been described and illustrated with respect to a particular construction of a memory card protective carrier 10, it will be understood by those skilled in the art that the present invention is not limited to the above described examples and embodiments. For example, the carrier 10 may be in a single memory card sleeve embodiment, or may include a plurality of memory card sleeves, such as the four memory card sleeves 16, 18, 20, 22 shown in FIGS. 1–5. Additionally, the compression tab aperture may include tab pairs, a single or multiple tabs, or the card sleeves maybe dimensioned to secure a memory card without compression tabs, using instead elasticity of the material making up the front and back frames, and a tight fit by the card sleeve. Accordingly, reference should be made primarily to the attached claims rather than to the foregoing specification to determine the scope of the invention.

What is claimed is:

1. A memory card protective carrier for carrying and protecting a memory card, comprising:
   a. a front frame secured adjacent a back frame including at least one memory card sleeve between the front and back frames;
   b. the memory card sleeve including a top strut opposed to a bottom strut, an inside strut positioned between the top and bottom struts, and a lock shoulder extending from the front frame toward the back frame from a position opposed to the inside strut and between the top and bottom struts, wherein the top, bottom and inside struts and lock shoulder cooperate to define a card slot;
   c. the front frame including a window perimeter that defines a card window, the window perimeter including a positioning guide in the shape of an asymmetrical corner adjacent the top strut; and,
   d. the back frame including a protective band extending from adjacent the top strut in a direction toward the bottom strut a distance that is at least fourteen per cent of a shortest distance between the top and bottom struts.

2. The memory card protective carrier of claim 1, wherein the protective band also extends from adjacent the bottom strut in a direction toward the top strut a distance that is at least fourteen per cent of a shortest distance between the bottom and the top struts.

3. The memory card protective carrier of claim 2, wherein the protective band also extends from adjacent the inside strut toward the lock shoulder a distance that is at least twenty per cent of a shortest distance between the inside strut and the lock shoulder, and also extends from adjacent the lock shoulder toward the inside strut a distance that is at least twenty per cent of a shortest distance between the lock shoulder and the inside strut.

4. The memory card protective carrier of claim 1, wherein the carrier includes at least two memory card sleeves between the front and back frames.

5. The memory card protective carrier of claim 1, wherein the carrier includes a first memory card sleeve having a first top strut, a first bottom strut, a first side strut, a first lock shoulder, and a first positioning guide, and the carrier includes a second memory card sleeve having a second top strut, a second bottom strut, a second side strut, second lock shoulder, and a second positioning guide, wherein the first top strut, first bottom strut, first side strut and first lock shoulder of the first memory card sleeve are disposed in mirror image association with the second top strut, second bottom strut, second side strut and second lock shoulder of the second memory card sleeve, and the first positioning guide is disposed in serial alignment with the second positioning guide.

6. The memory card protective carrier of claim 5 wherein the carrier also includes a third memory card sleeve and a fourth memory card sleeve, the third memory card sleeve having a third top strut, third bottom strut third side strut and third lock shoulder disposed in mirror image association with a fourth top strut, fourth side strut, fourth bottom strut and fourth lock shoulder of the fourth memory card sleeve, and the third memory card sleeve having a third positioning guide disposed in serial alignment with a fourth positioning guide of the fourth memory card sleeve.

7. The memory card protective carrier of claim 1, wherein the back and front frames are formed of one piece having coupling means for securing the front frame to the back frame.

8. A memory card protective carrier for carrying and protecting a memory card, comprising:
   a. a front frame secured adjacent a back frame including at least one memory card sleeve between the front and back frames;
   b. the memory card sleeve including a top strut opposed to a bottom strut, an inside strut positioned between the top and bottom struts, and a lock shoulder extending from the front frame toward the back frame from a position opposed to the inside strut and between the top and bottom struts, wherein the top, bottom and inside struts and lock shoulder cooperate to define a card slot;
   c. the front frame including a window perimeter that defines a card window, the window perimeter including a positioning guide in the shape of an asymmetrical corner adjacent the top strut;
   d. the back frame including a compression tab extending into a compression tab aperture defined within the back frame, the compression tab extending into the card slot toward the front frame; and,
   e. the back frame including a protective band extending from adjacent the top strut toward the bottom strut a distance that is adequate to over lie a data transfer port of the memory card whenever an asymmetrical corner of the memory card is secured adjacent the positioning guide of the window perimeter.

9. The memory card of claim 8, wherein the protective band extends from adjacent the top strut in a direction toward the bottom strut a distance that is at least fourteen per cent of a shortest distance between the top and bottom struts.

10. The memory card protective carrier of claim 9, wherein the protective band also extends from adjacent the bottom strut in a direction toward the top strut a distance that is at least fourteen per cent of a shortest distance between the bottom and the top struts, and the protective band also extends from adjacent the inside strut toward the lock shoulder a distance that is at least twenty per cent of a shortest distance between the inside strut and the lock shoulder, and also extends from adjacent the lock shoulder toward the inside strut a distance that is at least twenty per cent of a shortest distance between the lock shoulder and the inside strut.

11. The memory card protective carrier of claim 8, wherein the carrier includes at least two memory card sleeves between the front and back frames.

12. The memory card protective carrier of claim 11, wherein the carrier includes a first memory card sleeve having a first top strut, a first bottom strut, a first side strut, a first lock shoulder, and a first positioning guide, and the carrier includes a second memory card sleeve having a second top strut, a second bottom strut, a second side strut, second lock shoulder and a second positioning guide, wherein the first top strut, first bottom strut, first side strut and first lock shoulder of the first memory card sleeve are disposed in mirror image association with the second top strut, second bottom strut, second side strut and second lock shoulder of the second memory card sleeve, and the first positioning guide is disposed in serial alignment with the second positioning guide.

13. The memory card protective carrier of claim 12 wherein the carrier also includes a third memory card sleeve and a fourth memory card sleeve, the third memory card sleeve having a third top strut, third bottom strut, third side strut and third lock shoulder disposed in mirror image association with a fourth top strut, fourth side strut, fourth bottom strut and fourth lock shoulder of the fourth memory card sleeve, and the third memory card sleeve having a third positioning guide disposed in serial alignment with a fourth positioning guide of the fourth memory card sleeve.

14. The memory card protective carrier of claim 8, wherein the back and front frames are formed of one piece having coupling means for securing the front frame to the back frame.

15. The memory card protective carrier of claim 8, wherein the back and front frames are formed of one piece having coupling means for securing the front frame to the back frame.

16. A memory card protective carrier for carrying and protecting a memory card, comprising:
   a. a front frame secured adjacent a back frame including at least one memory card sleeve between the front and back frames;
   b. the memory card sleeve including a top strut opposed to a bottom strut, an inside strut positioned between the top and bottom struts, the top, bottom and inside struts extending between the front and back frames, and a lock shoulder extending from the front frame toward the back frame from a position opposed to the inside strut and between the top and bottom struts, wherein the top, bottom and inside struts and lock shoulder cooperate to define a card slot dimensioned to house a memory card;
   c. the front frame including a window perimeter that defines a card window dimensioned to over lie a perimeter of the memory card, the window perimeter including a positioning guide in the shape of an asymmetrical corner adjacent the top strut;
   d. the back frame including a compression tab extending into a compression tab aperture defined within the back frame, the compression tab extending into the card slot toward the front frame and biased to apply pressure to a memory card secured within the card slot; and,
   e. the back frame including a protective band extending from adjacent the top strut toward the bottom strut a distance that is adequate to over lie a data transfer port of the memory card whenever an asymmetrical corner of the memory card is secured adjacent the positioning guide of the window perimeter.

17. The memory card protective carrier of claim 16, wherein the protective band extends from adjacent the top strut in a direction toward the bottom strut a distance that is at least fourteen per cent of a shortest distance between the top and bottom struts.

18. The memory card protective carrier of claim 17, wherein the carrier includes at least two memory card sleeves between the front and back frames.

19. The memory card protective carrier of claim 18, wherein the carrier includes a first memory card sleeve having a first top strut, a first bottom strut, a first side strut, a first lock shoulder, and a first positioning guide, and the carrier includes a second memory card sleeve having a second top strut, a second bottom strut, a second side strut, second lock shoulder, and a second positioning guide wherein the first top strut, first bottom strut, first side strut and first lock shoulder of the first memory card sleeve are disposed in mirror image association with the second top strut, second bottom strut, second side strut and second lock shoulder of the second memory card sleeve, and the first positioning guide is disposed in serial alignment with the second positioning guide, and the carrier also includes a third memory card sleeve and a fourth memory card sleeve, the third memory card sleeve having a third top strut, third bottom strut, third side strut and third lock shoulder disposed in mirror image association with a fourth top strut, fourth side strut, fourth bottom strut and fourth lock shoulder of the fourth memory card sleeve, and the third memory card sleeve having a third positioning guide disposed in serial alignment with the fourth positioning guide of the fourth memory card sleeve.

* * * * *